United States Patent [19]

Namand

[11] Patent Number: 4,671,319

[45] Date of Patent: Jun. 9, 1987

[54] AUTONOMOUS ASSISTANCE DEVICE FOR A SAFETY VALVE

[75] Inventor: Henri Namand, Le Pecq, France

[73] Assignee: Framatome & CIE., Courbevoie, France

[21] Appl. No.: 734,242

[22] Filed: May 14, 1985

Related U.S. Application Data

[63] Continuation of Ser. No. 484,030, Apr. 11, 1983, abandoned.

[30] Foreign Application Priority Data

Apr. 13, 1982 [FR] France .................. 82 06336

[51] Int. Cl.[4] ............................................ F16K 17/00
[52] U.S. Cl. ................................. 137/492.5; 137/488; 251/129.15
[58] Field of Search ................. 137/488, 492, 492.5, 137/487.5; 251/30; 220/82 R

[56] References Cited

U.S. PATENT DOCUMENTS

| | | | |
|---|---|---|---|
| 862,867 | 8/1907 | Eggleston | 417/390 |
| 2,059,635 | 11/1936 | Fillo | 137/487.5 |
| 2,422,819 | 6/1947 | Becker | 220/82 R |
| 3,308,846 | 3/1967 | Yuile | 137/492.5 |
| 3,865,132 | 2/1975 | Wiegand | 137/492.5 |
| 4,043,533 | 8/1977 | Cowley | 251/30 |
| 4,129,141 | 12/1978 | Vogeli | 137/488 |
| 4,143,851 | 3/1979 | Lange | 251/30 |
| 4,240,463 | 12/1980 | Moore | 137/488 |
| 4,249,556 | 2/1981 | Waletzko | 137/488 |
| 4,320,779 | 3/1982 | Peters | 137/492.5 |

FOREIGN PATENT DOCUMENTS

| | | | |
|---|---|---|---|
| 2947216 | 6/1981 | Fed. Rep. of Germany | 137/492.5 |
| 39392 | 12/1970 | Japan | 137/488 |
| 149471 | 11/1980 | Japan | 137/488 |
| 1875 | 11/1889 | United Kingdom | 137/492.5 |
| 1264119 | 2/1972 | United Kingdom | 137/492.5 |
| 2077393 | 12/1981 | United Kingdom | 137/488 |

OTHER PUBLICATIONS

Pneumatic Valve Positioners, by James B. Madison.

Primary Examiner—Robert E. Garrett
Assistant Examiner—John Kwon
Attorney, Agent, or Firm—Pollock, Vande Sande & Priddy

[57] ABSTRACT

Autonomous assistance device for a safety valve protecting a vessel under pressure and comprising a hollow body (13), a seat cooperating with a movable closure member fixed to a rod (9), and a calibrated spring (7) bearing against the rod (9) and against the valve body (13) to hold the closure member against the seat. The closure member rod (9) is extended into a casing (19) fastened to the body (13) and receives the additional thrust of a spring (51). The casing (19) constitutes in addition a pneumatic ram whose piston (53) can apply to the rod (9) a thrust opposite to and greater than that of the spring (51). The device feeding the ram (19) comprises an autonomous reservoir (33), a three-way solenoid valve (24) for feeding the ram or connecting it to atmosphere, and a manometer contact (39) mounted on the wall of the pressure vessel and adjusted to close the solenoid valve supply circuit when the pressure in the vessel reaches the adjusted pressure.

4 Claims, 2 Drawing Figures

AUTONOMOUS ASSISTANCE DEVICE FOR A SAFETY VALVE

This application is a continuation of application Ser. No. 484,030, filed Apr. 11, 1983, now abandoned.

FIELD OF THE INVENTION

The present invention relates to an autonomous assistance device for a safety valve intended to protect a vessel or a pipe against inadvertent excessive internal pressures.

BACKGROUND OF THE INVENTION

Valves of this kind are very generally composed of a hollow body mounted on the vessel and communicating with the interior of the latter. Inside the hollow body a movable closure member mounted on the end of a rod is adapted to move between a closure position, in which it bears in a leaktight manner against its seat, and an open position in which it is moved away from the seat. A calibrated spring is in compression between a member fixed to the valve body and a member fixed to the closure member rod, in such a manner as to apply to the closure member a thrust holding it in the closed position as long as the pressure in the vessel does not exceed the preset value.

When the closure member is lifted through the action of an excessive pressure, part of the fluid under pressure is discharged from the vessel, thus making it possible to bring the pressure back to a value lower than the preset value, and the calibrated spring returns the closure member to its closed position on its seat.

However, numerous factors may disturb the operation of ordinary valves of this kind, such as, for example, the formation, at the moment of opening, of pressure waves in the fluid contained in the vessel, or, in the case of incompressible fluids, the formation of local negative pressures just upstream of the closure member, thus causing the latter to close before the pressure has actually fallen throughout the vessel. All these factors result in unstable operation of the valve and hunting of the closure member, which may in turn give rise to the seizure of the valve or hammering in the pipes protected by the valve.

In order to eliminate these disadvantages, it appears necessary to provide assistance for the operation of the closure member. Assistance in opening amounts to momentarily reducing the calibration of the spring in order to obtain clean, rapid opening when the pressure in the vessel attains the critical value, and preventing the closure member from tending to reclose immediately through the action of a local fall in pressure; on the other hand, assistance in closing amounts to increasing the calibration in order to ensure sharp closure and preventing inadvertent reopening when the total pressure in the vessel has dropped back below the preset value.

For this purpose various assistance devices have already been proposed which utilize magnetic or pneumatic means, but they always have, either separately or simultaneously, various kinds of disadvantages. In some cases, assistance both in opening and in closing is not achieved, or else these devices constitute only simple dampers for the movement of the closure member.

Other devices provide only assistance in locking at the end of the opening or closing movement of the closure member. Certain devices are not entirely autonomous and depend on a general compressed air distribution system or an electricity supply system, so that their operational reliability may be jeopardized in the event of a failure of the supply, although the device should then continue to serve its safety function. Still other devices make use of complex fluid distribution circuits, thereby increasing the risk of failure. Finally, it is advantageous in industry to be able to fit such assistance devices to conventional valves already installed, and also to be able to make tests without load, without having to dismantle the equipment; this last point is particularly important in pressure vessels in nuclear reactors.

SUMMARY OF THE INVENTION

The present invention provides a solution to all these problems, and relates to an assistance device for a safety valve protecting a vessel containing a fluid under pressure, the valve comprising a hollow body mounted on the vessel and communicating with the interior of the latter, a seat cooperating with a movable closure member fixed to a rod, and a calibrated spring bearing against the rod at one of its ends and against the valve body by its other end, in order to hold the closure member in leaktight contact with the seat as long as the internal pressure of the vessel remains below an adjusted limit pressure.

According to the invention, the closure member rod is extended into a casing fixed to the valve body in such a manner as to receive, in the same direction as the thrust of the calibrated spring, the additional thrust of a supplementary spring bearing against the extension of the rod by one of its ends and against the casing by its other end. The casing constitutes in addition a single-acting pneumatic ram whose piston, when the ram is fed, applies to the closure member rod a thrust opposite to and greater than that of the supplementary spring. Furthermore, the ram feed device comprises:

an autonomous reservoir of pressurized gas with a pressure reducing valve;

a three-way solenoid valve connected in such a manner that in the energized position it feeds the ram from the reservoir and in the position of rest it isolates the reservoir and vents the ram chamber to the ambient atmosphere;

a manometer contact mounted on the wall of the vessel for the purpose of feeding the solenoid valve coil from an electric source assisted by batteries, the manometer contact being adjusted to close the coil supply circuit when the pressure in the vessel reaches the preset pressure.

In one particular embodiment of the invention, the pressure reducing valve of the gas reservoir is a regulating reducing valve which ensures, relative to ambient pressure, a constant differential pressure for feeding the ram with the aid of the three-way valve.

In a preferred embodiment, the supplementary spring applies to the closure member rod a thrust in the same direction and of the order of 5% of the adjusted force of the main spring, while the pressure applied by the ram, which is in the opposite direction to that of the main spring, is of the order of 17% of the latter.

BRIEF DESCRIPTION OF THE DRAWINGS

The invention will be better understood by referring to one particular embodiment given by way of example and illustrated in the accompanying drawings.

DETAILED DESCRIPTION

Figure 1:
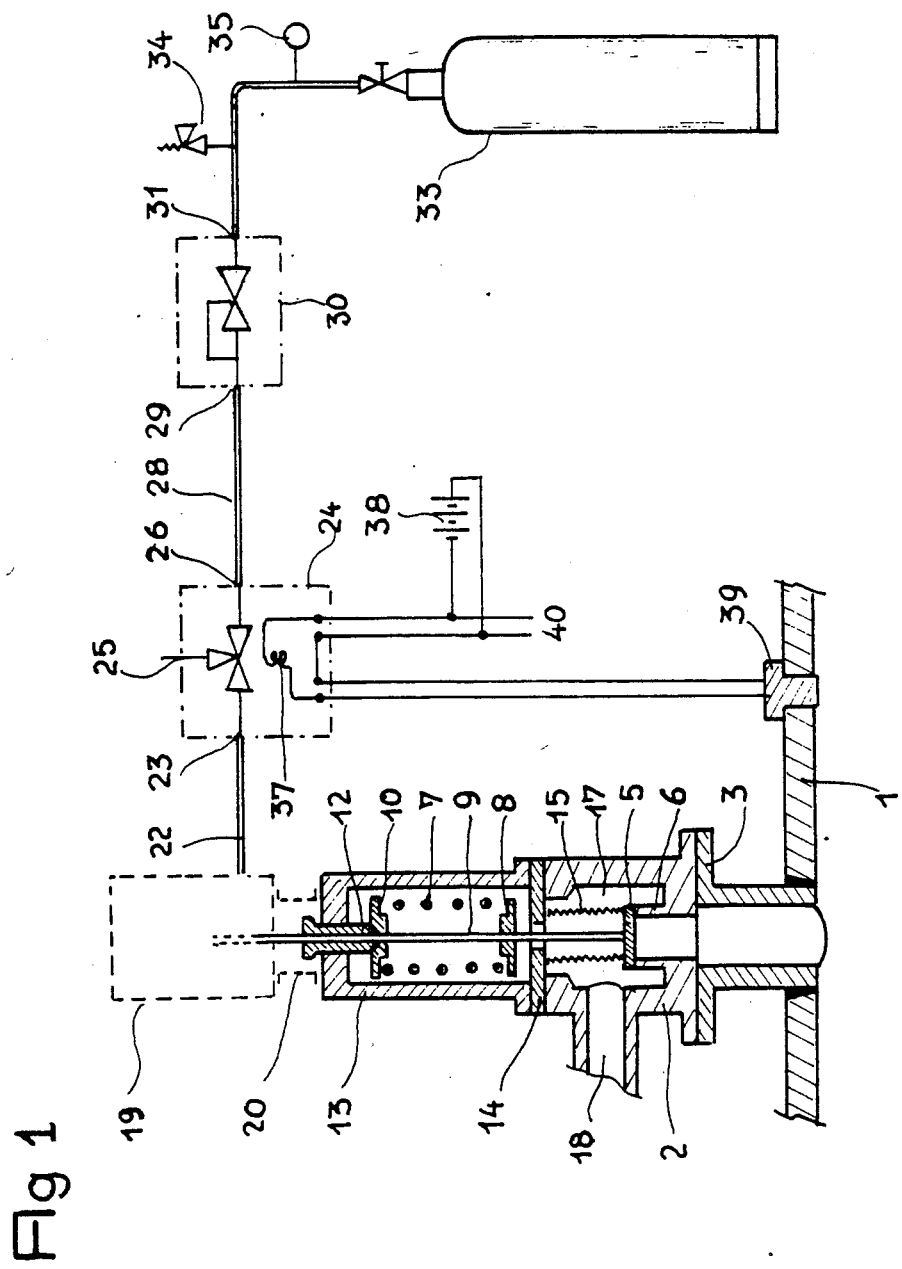
FIG. 1 is a simplified general diagram of the whole of a valve assistance installation constructed in accordance with the invention.

Reference will first be made to FIG. 1, which shows the installation of an ordinary safety valve on the wall 1 of a vessel containing a fluid under pressure. The body 2 of the actual valve is fixed on the flange 3 of a connection made on the wall of the vessel. The valve is shown in the closed position, with the closure member 5 bearing in a leaktight manner against the seat 6 under the action of the spring 7 acting on the member 8 fixed to the closure member rod 9. At its other end, the spring 7 reacts on the member 10, through which the rod 9 passes freely. The position of the member 10 is fixed by the hollow screw 12 engaged in the dome 13 of the valve, this dome being in turn fixed on the body 2 with the interposition of a seal 14. A sealing bellows 15 connects the closure member 5 to the seal 14 and surrounds the bottom part of the rod 9.

As long as the pressure in the vessel does not exceed the adjusted value determined by the force of the compressed spring 7, the closure member 5 remains in contact with the seat 6. When, on the other hand, the pressure under the closure member gives rise to a thrust higher than that of the opposing spring 7, the closure member is raised and the fluid in the vessel is discharged first into the chamber 17 and then into the outlet pipe 18.

In the present embodiment of the invention, the dome 13 of the valve is surmounted by a ram casing 19, which is here simply shown in silhouette in dash lines, and the internal structure of which will be seen later on in connection with FIG. 2. The top end of the closure member rod 9 penetrates into the casing 19, also passing through the connecting spacer 20.

The ram 19 is connected by a pipe 22 to one of the ways 23 of a three-way solenoid valve 24. The other ways 25 and 26 of the solenoid valve are, respectively, connected to atmosphere and connected by the pipe 28 to the low-pressure outlet 29 of a regulating reducing valve 30. The high-pressure inlet 31 of the reducing valve 30 is connected to a pressurized gas cylinder 33, the gas being air or a neutral gas. A safety valve 34 and a control pressure gauge 35 complete the equipment.

The coil 37 of the solenoid valve 24 is fed from a source 40 assisted by batteries 38 of the emergency circuits of the installation and by a contact manometer 39 mounted on the wall 1 of the vessel. The contact manometer 39 is adjusted to the limit pressure which is to be maintained in the vessel, or very slightly below that pressure. As long as the pressure in the vessel remains lower than this critical pressure, the contact 39 remains open and the coil 37 is not fed; in this position of rest the solenoid valve isolates the supply pipe 28 and vents the ram 19 by connecting the ways 23 and 25 to atmosphere. The closing of the manometer contact 39 energizes the coil 37 and causes the solenoid valve to move to its other position, in which the way 25 is closed while the ways 23 and 26 are in communication in order to supply pressurized gas from the cylinder 33 and the reducing valve 30 to the ram 19.

Figure 2:
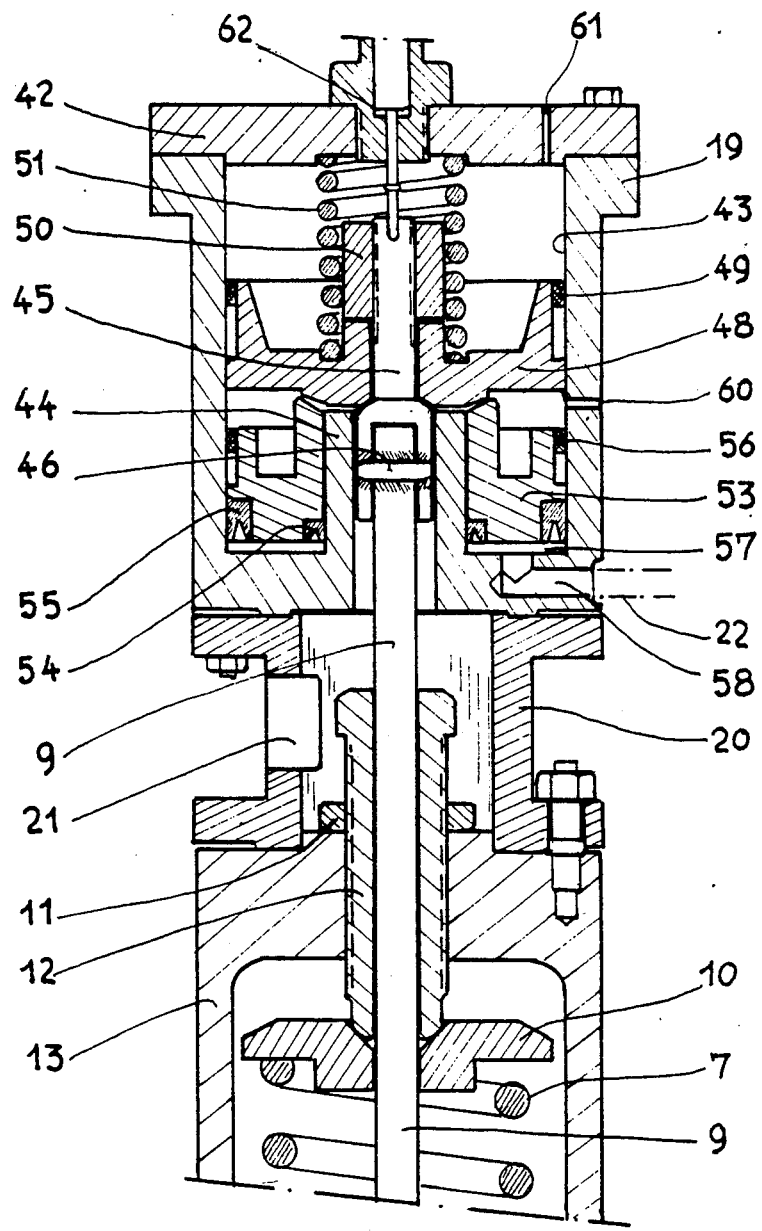
FIG. 2 shows in enlarged scale a detail of the ram casing.

Reference will now be made to FIG. 2, which shows in greater detail the casing 19, the spacer 20, and the top part of the dome 13. It is possible here to see more clearly the calibration adjustment screw 12, which, depending on its depth of penetration into the top part of the dome 13, compresses the spring 7 to a greater or lesser extent by means of the member 10, and thus modifies the pressure which must be attained in the vessel in order to lift the closure member 5. The calibrating screw 12 is locked in the adjusted position by means of the locknut 11.

The tubular spacer 20, which is fixed both to the dome 13 and to the bottom of the casing 19, is provided with a side window 21 permitting access both to the head of the calibration adjustment screw 12 and to the lock nut 11.

The casing 19, closed by a cap 42, is bored internally to form a cylinder 43 and is provided with an annular internal return 44 into which the top part of the rod 9 penetrates. The rod 9 is extended by an extension 45 fastened at 46 on the rod. The plate 48, guided in the cylinder 43 by graphite rings 49, is locked by the nut 50 on the extension 45. The plate 48 receives the thrust of the supplementary spring 51, which also bears against the cap 42.

The bottom part of the cylinder 43, at the level of the return 44, is provided with an annular piston 53 carrying internal and external sealing rings 54 and 55 respectively and also graphite guide rings 56. The chamber 57 of the ram thus formed is in communication through the duct 58 with the pipe 22 connecting to the way 23 of the solenoid valve.

In the position of rest, as shown in the drawings, the chamber 57 is in communication with the ambient atmosphere because the ways 23 and 25 of the solenoid valve are in communication with one another. The piston 53 is free in its cylinder. The closure member rod 9 is at the end of its closing movement and receives simultaneously the thrust of the main calibrated spring 7 through the member 8, and the additional thrust of the supplementary spring 51 through the plate 48. The spring 51 is designed to give an additional force of the order of 5% of the normal calibration force of the main spring 7. In the position of rest a slight clearance exists between the return 44 and the plate 48, which is then in the lowest position, and also between the plate 48 and the piston 53, which also naturally falls back to the bottom position.

If the pressure in the vessel under protection attains the critical value which must not be exceeded, the contact manometer energizes the coil of the solenoid valve 24, which in turn feeds the chamber 57 with gas under pressure. The piston 53 then applies to the plate 48 a thrust opposite to that of the spring 51. The pressure of the feeding of the chamber 57 is so determined that the thrust of the ram 53 is about 17% of the nominal calibration thrust given by the main spring 7. It can be seen that as soon as the solenoid valve is operated, the closing thrust, which under the action of the supplementary spring 51 was about 5% higher than the nominal thrust adjusted, abruptly passes to a value lower by about $17\% - 5\% = 12\%$ than the nominal thrust adjusted. The valve can thus open cleanly under the pressure applied under the closure member. The pressure just below the closure member may even fall locally to 88% of the adjusted value without giving rise to the premature reclosure of the closure member or to the hunting of the latter.

Conversely, when the general pressure in the vessel has dropped back below the critical value, the opening of the manometer contact 39 will lead to the connection of the ram chamber 57 to atmosphere and to the elimination of the thrust of the piston 53. The thrust on the closure member will therefore once again instantaneously become 105% of the adjusted value, thus leading to the clean closing of the closure member, without hunting, even if the pressure is still slightly in excess just below the closure member, for example because of pressure wave phenomena or of a change of state of the discharged fluid, changing from the vapor to the liquid state or vice versa.

It can first be noted that assistance is thus obtained in the opening and in the closing of the valve, of the order of 12% and 5% respectively of the nominal adjusted value, while complete autonomy is retained. This autonomy is achieved both through the independent reservoir 33 supplying pressurized gas and through the supply of electricity to the solenoid valve from a source assisted by batteries of a control circuit, which are independent of the mains or generator sets. The consumption of pressurized gas is limited to one volume of the chamber 57 for each opening and closing cycle of the valve, thus ensuring long term autonomy with a conventional cylinder 33.

It will also be noted that the operation of the assistance device would still be unchanged if it were used in a confined space where ambient conditions of pressure and temperature were modified. The ambient pressure, in fact, is applied through the vents 60 and 61 on the other face of the piston 53 and above the plate 48. But because of the action of the regulating reducing valve 30, the differential pressure in relation to the atmosphere remains constant at the low-pressure outlet 29, so that the assistance force supplied for opening by the piston 53 will remain constant whatever the ambient pressure. Moreover, the vent 61 can be dimensioned so as to constitute a damper in the event of too abrupt opening of the valve.

The device thus constituted in accordance with the invention cannot, furthermore, give rise to additional risk in the event of the failure of its own components. If, for example, the solenoid valve 24 should in fact fail to open when the coil is energized, there would no longer be any assistance for the opening, but the only disturbance to the functioning of the safety valve would be an increase of 5% of its adjusted value for opening purposes, which is always acceptable having regard to the general coefficients of safety adopted. The same would be true in the event of a fracture of one of the supply pipes or of the reducing valve, or in the event of the inadvertent operation of the valve 34.

Conversely, if after the opening the solenoid valve should not vent the chamber 57 to atmosphere but should maintain the pressure in it, everything would take place as if the adjustment of the safety valve were reduced by 12%, which would increase the safety of the installation; the pressure in the chamber 57 would in fact remain constant, because the excess pressure caused by the closing movement under the action of the springs 7 and 51 would be cancelled by the action of the regulating reducing valve 30.

Finally, it will be noted that the device described makes it possible to carry out no-load operation tests when the vessel which is to be protected is no longer under pressure, and without having to dismantle either the actual valve or its assistance device. To do this, it is sufficient, for an opening test, to adjust the reducing valve 30 so that it delivers at its output 29 a pressure which produces under the piston 53 a thrust higher than 105% of the normal adjusted value, and to energize the coil 37 of the solenoid valve, in order to check by means of a position detector 62 the opening of the closure member, which takes place in this case under the same conditions as if the critical pressure prevailed under the closure member. Conversely, by maintaining the feeding of the chamber 57, but adjusting the reducing valve 30 so that it delivers a pressure which produces under the piston 53 a thrust lower than 105% of the nominal adjusted value, the valve should close under conditions corresponding to a return to a pressure below the critical value in the vessel.

I claim:

1. A safety valve system for protecting a vessel containing pressurized fluid, comprising:
   a relief valve including a hollow body formed with a valve seat having an axis and defining a passage for communication with said vessel; a movable closure member mounted for movement along said axis toward a seated position on said seat and away from said seat; a rod coaxial with said seat and having a first end portion fixed to said closure member and a second end portion opposite to the first end portion and projecting out of said body; calibrated spring means in said body operatively associated with said closure member and exerting thereto a force biasing said closure member toward leak-tight contact with said seat and overcoming the force exerted by the fluid in said vessel on said closure member as long as said pressure remains below a predetermined limit pressure;
   and an autonomous assistance device comprising:
   (a) a single acting pneumatic ram having: a casing independent of said body, defining a cylinder coaxial with said rod and fixed to said body in a position where said second end portion of said rod projects into said cylinder; a plate slidably received in said cylinder for movement coaxially with said rod and secured to said second end portion of said rod; additional spring means in said casing exerting a thrust on said plate in the closing direction of said closure member; a ram piston located round said rod between said plate and said body, slidably received in said cylinder and defining a chamber with said body so located that pressurization of said chamber applies to said piston a thrust in the opening direction of said closure member toward said plate for abutting connection with said plate; and
   (b) feeding means associated with said pneumatic ram and comprising a reservoir for pressurized gas, solenoid valve means having a rest condition in which it isolates said reservoir and vents said chamber to the ambient atmosphere and an energized condition for connection of said reservoir with said chamber, whereby a sufficient pressure is built up in said chamber for the pressure force exerted on said ram piston to overcome the return force of said additional spring means, and pressure sensitive means carried by said vessel for energizing said solenoid valve upon the pressure in said vessel exceeding a predetermined preset pressure close to and lower than said predetermined limit pressure.

2. The safety valve system of claim 1, further comprising a pressure reducing valve associated with said reservoir, constructed and arranged for maintaining a constant differential pressure relative to the ambient conditions.

3. The safety valve system of claim 1, wherein said additional spring means are calibrated to apply onto said rod a thrust of about 5% of the force of said calibrated spring means and wherein said ram piston and the pressure in said reservoir are so proportioned that the thrust applied by said ram in the direction opposite to that of said calibrated spring means upon energization of the solenoid is of about 17% of the force of said calibrated spring.

4. The safety valve system of claim 1, wherein said means for energizing said solenoid valve include an electrical source assisted by batteries.

* * * * *